Figure 1:
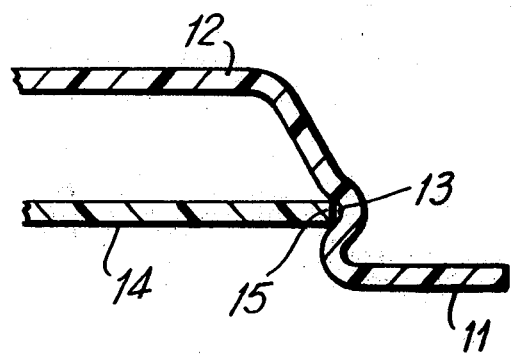

United States Patent [19]

Hanstein et al.

[11] 4,188,425
[45] Feb. 12, 1980

[54] DOUBLE-WALLED SHAPED PLASTIC ARTICLES

[75] Inventors: Friedrich Hanstein, Gross-Zimmern; Theodor P. Moench, Griesheim B. Darmstadt; Günter Schreyer, Darmstadt, all of Fed. Rep. of Germany

[73] Assignee: Rohm GmbH, Darmstadt, Fed. Rep. of Germany

[21] Appl. No.: 896,618

[22] Filed: Apr. 14, 1978

[30] Foreign Application Priority Data

Apr. 28, 1977 [DE] Fed. Rep. of Germany ....... 2718949

[51] Int. Cl.² .................. B32B 17/00; B32B 27/06; E06B 3/24; C03C 27/12
[52] U.S. Cl. ........................... 428/34; 428/53; 428/68; 428/120; 428/161; 428/177; 428/913
[58] Field of Search ............ 428/13, 14, 31, 34, 428/53, 68, 119, 120, 161, 177, 913

[56] References Cited

U.S. PATENT DOCUMENTS

| | | | |
|---|---|---|---|
| 2,601,658 | 6/1952 | Bussert | 428/13 X |
| 2,987,843 | 6/1961 | Anthony | 428/13 |
| 3,573,149 | 3/1971 | Tibble et al. | 428/34 X |
| 3,802,945 | 4/1974 | James | 428/913 X |

FOREIGN PATENT DOCUMENTS 2332360 1/1974 Fed. Rep. of Germany.
2433343 6/1975 Fed. Rep. of Germany.

*Primary Examiner*—Harold Ansher
*Attorney, Agent, or Firm*—Curtis, Morris & Safford

[57] ABSTRACT

What is disclosed is a double-walled shaped plastic article comprising a first sheet of a synthetic resin having a geometrically regular depression therein, the depressed portions of which are connected to surrounding planar portions of said sheet by a side wall, a circumferential groove in said side wall, and a second sheet of synthetic resin having edge portions pressure fitted into said circumferential groove.

5 Claims, 3 Drawing Figures

DOUBLE-WALLED SHAPED PLASTIC ARTICLES

The present invention relates to double-walled shaped plastic articles.

When synthetic resin elements are used, in the housing and transportation sectors for example, there is often an advantage in making these elements double-walled. Such a construction has readily evident effects, for example increased mechanical resistance to stress to the extent that the elements are bound one to another, or an isolating or insulating action.

The advantages of such a double-walled embodiment are particularly effective if synthetic resins of an "organic glass" are employed, that is if transparency or translucency is demanded of the element prepared from the resin. In addition to those questions directly related to the material properties of the organic glasses and difficulties relating generally to technical processing which can also arise in other fields of use, additional technical problems are noticeable in the preparation of double-walled shaped pieces of synthetic resin. Double-walled shaped pieces formed from an organic glass synthetic resin and used for glazing in building, for example as illuminating domes, or in vehicles and the like, are as a rule constructed from elements which are substantially planar or which may be slightly arched. These elements are tightly and permanently bound together pairwise, maintaining a separation therebetween.

In order to adhere two such synthetic resin elements (sheets) permanently to form a shaped body without the use of supplementary bonding elements, one embodiment suggests a form in which at least one of the two synthetic resin sheets to be bound to the other is bowed, arched, or domed so that a defined edge region is present with which bonding to the other sheet can be undertaken. In addition, in certain cases a domed form of this type is an obvious three-dimensional creation from the point of view of mechanical and aesthetic reasons, as well as for reasons relating to the technique of working the materials.

Thus, a double-walled domed shaped piece comprising two sheets of organic glass with a closed interior space (to the greatest extent possible) recommended itself, for example for illuminating domes, windows in vehicles (particularly windows in mobile homes), port holes, and the like.

For bonding the synthetic resin sheets which are to be joined, known joining methods suitable to the materials to be joined can be employed. It is possible, for example, to effect a mechanical joinder of the parts by clamping, screwing, or riveting them together, and the like, or they can be joined by welding or, above all, by adhesion of the synthetic resin.

These joining methods as a rule have undesirable aspects: either the methods per se may be expensive and labor-intensive, or there may be a possible danger of mechanical damage to the shaped parts during the joining process or at some later point in time, for example when they are installed in the place where they are to be used, or it may be that the prepared shaped pieces do not fully satisfy quality requirements.

For example, when pieces are joined by an adhesive which otherwise is suitable for the materials being joined, the danger arises that the quality of the sheet material will subsequently be detrimentally influenced by solvents and/or monomer vapors within the enclosed space. When welding, distortions and deformations of the synthetic resin sheets can result, which is particularly undesirable when synthetic resins are used for glazing.

In every case, achieving a seal between the joined sheets, which is sufficient against the penetration of moisture and dust, is problematic.

It has now been found that double-walled shaped pieces can be prepared from a first, or base, plate of a thermoelastic synthetic resin having a geometrically-regular dome or depression therein and from a second synthetic resin sheet or cover which is firmly fastened to and tightly seals the first plate, by forming the geometrically uniform dome or depression in the synthetic resin base sheet when the sheet is in the thermoelastic condition and further forming a peripheral groove in the side wall of the dome or depression, into which groove the second synthetic sheet or cover, of corresponding dimensions, is subsequently snapped or alternatively that double-walled shaped pieces can be prepared from a base plate of thermoplastic material having a geometrically-regular dome or depression therein and a peripheral groove in the side wall of the dome, the base plate with said regular dome or depression and said peripheral groove in the side wall of the dome being produced by shaping the thermoplastic material in a manner known per se, e.g. by injection moulding or by compression moulding.

Figure 2:
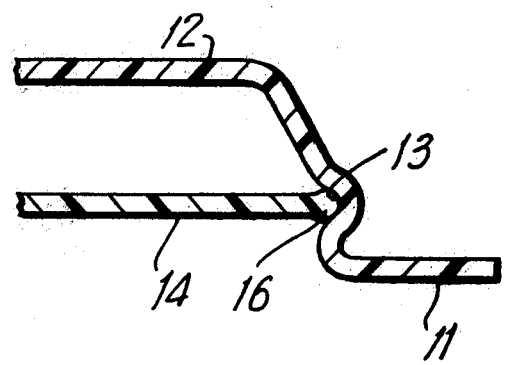
Figure 3:
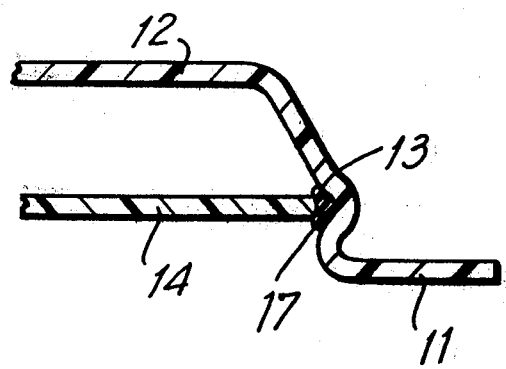

A better understanding of the present invention and of its many advantages will be had by referring to the accompanying drawings, in which FIGS. 1–3 are all side sectional views of a portion of different embodiments of a double-walled shaped plastic article, for example a window for a mobile home, van, or other vehicle.

More in particular, FIG. 1 shows base plate 11, suitably of a transparent synthetic resin, having dome or depression 12 therein. Dome 12 is geometrically regular, for example rectangular, square, circular, oval, etc. and has peripheral groove 13 formed therein, suitably running around the circumference of dome 12. Cover-sheet 14, also suitably of a transparent resin, is joined to base plate 11 by having its edge portions 15 snapped into groove 13.

As shown in FIG. 2, the edge portions of cover 14 may be shaped to give them cross-section 16 which affords a tighter fit or seal between the cover sheet and groove 13 of base plate 11.

FIG. 3 shows a further embodiment wherein gasket or sealing ring 17, suitably of an elastic material such as rubber, is present in groove 13 to effect a tight seal between cover 14 and base plate 11.

In fields of use relating to optics and light, the double-walled shaped pieces according to the present invention advantageously employ transparent or translucent synthetic resins such as acrylic resins, polycarbonates, polystyrene, polyvinylchloride, cellulose acetate, cellulose acetobutyrate as well as copolymers and polymer mixtures thereof, plus impact resistant modifications of said polymers & copolymers. In this connection, installations requiring safety glass, vehicle windows such as windows for mobile homes, portholes, etc., and, further, glazing for buildings, such as illuminating domes, should be mentioned. The form and dimensions of the double-walled shaped structures according to the present invention are primarily determined by their intended function.

For example, if an optimally transparent, distortion-free glazing is sought, the synthetic resin base sheet (hereinafter referred to as the "resin base sheet") and the tightly sealing cover sheet solidly joined thereto (hereinafter referred to as the "resin cover sheet") are so arranged, for example, that both sheets are parallel—up to the domed part of the resin base sheet—and are separated by a distance defined by the depth of the dome and by the position of the groove pressed into the side wall of the dome.

The joinder of the resin cover sheet is, evidently, effected by its being held in the groove, i.e. it is mechanical. In order to achieve the tightness desired for glazing purposes, for example, the dimensions of the formed resin base sheet and the resin cover sheet can be fitted one to the other or, on the other hand, adherence and tightness can be influenced by forming the edge portions of the resin cover sheet as well as by the way the groove is fashioned. For example, the adhering edges of the resin cover sheet can be made with a particularly advantageous cross section, as shown in FIG. 2. Advantageous closure properties are also to be expected by employing thermoelastic material if the groove is undercut into the thermoelastic material to be used as the synthetic resin base sheet during the forming thereof.

In a particular embodiment of the invention, a sealing ring of an elastic material such as rubber, for example, is snapped in together with the synthetic resin cover sheet, as shown in FIG. 3.

The resin cover sheet may be a planar, but it may also be formed, for example domed. It is necessary in order to snap in the cover sheet according to the invention that it have an edge which fits the groove.

As for the thermoelastic material to be used for the resin base sheet, when the base plate is produced by forming such thermoelastic material it is required that it can be formed conveniently and that the groove which serves to accept the resin cover sheet can be shaped therein. If the base plate is procuced employing thermoplastic material it is required that the base plate may be conveniently shaped into the required form having the desired properties e.g. by injection moulding or by compression moulding.

Acrylic glasses, polycarbonates, polystyrene, and polyvinylchloride, as well as copolymers and mixtures of these polymers are to be considered for the particularly preferred field of glazing. The thickness of the materials used can vary between certain limits depending on the use of the double-walled shaped piece. In general, the thickness will be between 2 mm and 10 mm and, in the glazing sector, preferably between 2 mm and 5 mm.

In essence, the explanations concerning the resin base sheet pertain also to the resin cover sheet. From the point of view of material properties, the cover sheet must be adaptable to being snapped into the groove of the resin base sheet. That is, it must have a corresponding mechanical strength. In general, the materials which are employed for preparing the resin base sheet can also be used for the cover sheet. In principle, when employing thermoelastic material conventional forming processes such as positive and negative forming can be used for preparing the formed resin base sheet and, optionally, the resin cover sheet. The forming is carried out in known ways taking into consideration the material used. In principle, the groove can also be produced into a formed half-finished article which corresponds in its dimensions to the resin base sheet.

Suitably, the forming of the thermoelastic material employed as the resin base sheet and the impressing of the groove takes place in one working step.

Double-walled domed shaped articles prepared according to the invention from the afore-described synthetic resin elements offer a variety of considerable advantages in comparison with the state of the art.

For example, in addition to the forming or reforming of the resin base sheet and the resin cover sheet, only the additional step of snapping in the cover is required, apart from mounting the double-walled construction where it is to be used.

In contrast to the adhesive methods now predominantly employed for joining two walls, the process according to the present invention has the advantage—in addition to the simplification of technical operation—that there is no detrimental effect on the sheet quality by solvents and/or monomers in a gaseous state. The shaped articles made according to the present invention, particularly if they are prepared from organic glass of high optical quality, are characterized by perfect transparency, mechanical stability, and a functionality appropriate to the material employed. In addition, the replacement of a broken resin cover sheet, for example, is possible.

What is claimed is:

1. A double-walled shaped plastic glazing article comprising a first-sheet of a translucent synthetic resin of substantially uniform thickness having a geometrically regular depression formed therein having a base portion connected to surrounding planar portions of said sheet by a peripheral side wall, said side wall having a circumferential groove of uniform cross-section formed therein facing inwardly of said depression, and a second sheet of synthetic translucent resin having a peripheral edge portion which is generally complementary to the peripheral configuration of the groove being pressure fitted into said circumferential groove, said groove being spaced from said base portion of the depression to define an air chamber in the glazing article.

2. An article as in claim 1 wherein said first and second sheet of synthetic resin are transparent.

3. An article as in claim 1 wherein said circumferential groove is undercut into said side wall.

4. An article as in claim 1 wherein said edge portion of said second sheet of synthetic resin, have a cross-section congruent with said groove.

5. An article as in claim 1 wherein an elastic sealing ring is additionally present in said circumferential groove between the groove and the edge of the second sheet.

* * * * *